United States Patent [19]
Halberg et al.

[11] Patent Number: 5,977,496
[45] Date of Patent: Nov. 2, 1999

[54] SWITCH SENSOR WITH INTERNAL SHEAR PIN DESIGN

[75] Inventors: Roger Halberg; Dean McClenathan, both of Winona, Minn.

[73] Assignee: Kelsy-Hayes Company, Livonia, Mich.

[21] Appl. No.: 09/267,834

[22] Filed: Mar. 12, 1999

[51] Int. Cl.$^6$ .................................................. H01H 19/54
[52] U.S. Cl. .................... 200/61.88; 200/11 R; 200/571; 200/61.91
[58] Field of Search ............................ 29/622; 192/89.22; 200/4, 6 R, 11 R–11 J, 17 R, 61.27, 61.28, 61.54, 61.85, 61.89, 61.39, 564, 570–572, 332, 335, 336, 300, 61.91, 61.08; 267/161, 162; 477/34, 36, 165

[56] References Cited

U.S. PATENT DOCUMENTS

| | | | |
|---|---|---|---|
| 3,299,227 | 1/1967 | Schaad et al. | 200/16 |
| 3,809,832 | 5/1974 | Burger | 200/61.18 |
| 3,939,313 | 2/1976 | Hayashi et al. | 200/11 J |
| 4,390,761 | 6/1983 | Introvigne | 200/67 C |
| 4,814,550 | 3/1989 | Newberg | 174/138 R |
| 5,525,768 | 6/1996 | Cobb, III et al. | 200/61.88 |
| 5,577,605 | 11/1996 | Dilly et al. | 200/564 |
| 5,679,937 | 10/1997 | Iwata | 200/61.88 |
| 5,693,925 | 12/1997 | Yamada et al. | 200/61.88 |
| 5,762,183 | 6/1998 | Iwata | 200/571 |
| 5,828,022 | 10/1998 | Nakazawa et al. | 200/61.88 |

*Primary Examiner*—Michael Friedhofer
*Attorney, Agent, or Firm*—Harness, Dickey & Pierce

[57] ABSTRACT

A switch sensor is provided including a housing. A switch circuitry is disposed within the housing. An electrical contactor carrier is movably mounted within the housing. The electrical contactor carrier includes a shear pin hole and the housing includes a corresponding hole which each receive a shear pin therein for holding the electrical contactor carrier in a predetermined position relative to the housing during installation. The shear pin is totally contained on the inside of the switch.

6 Claims, 2 Drawing Sheets

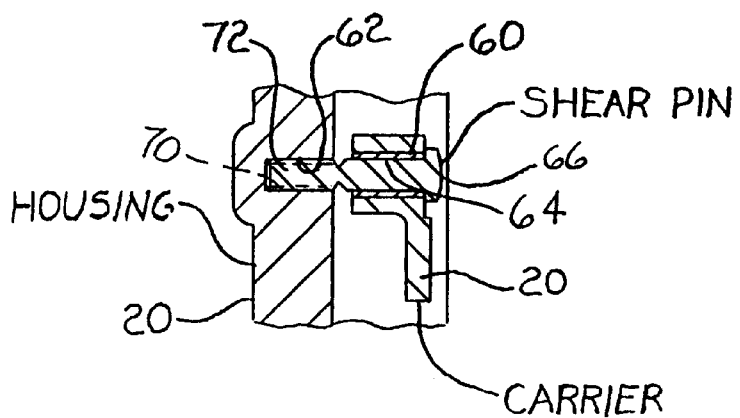
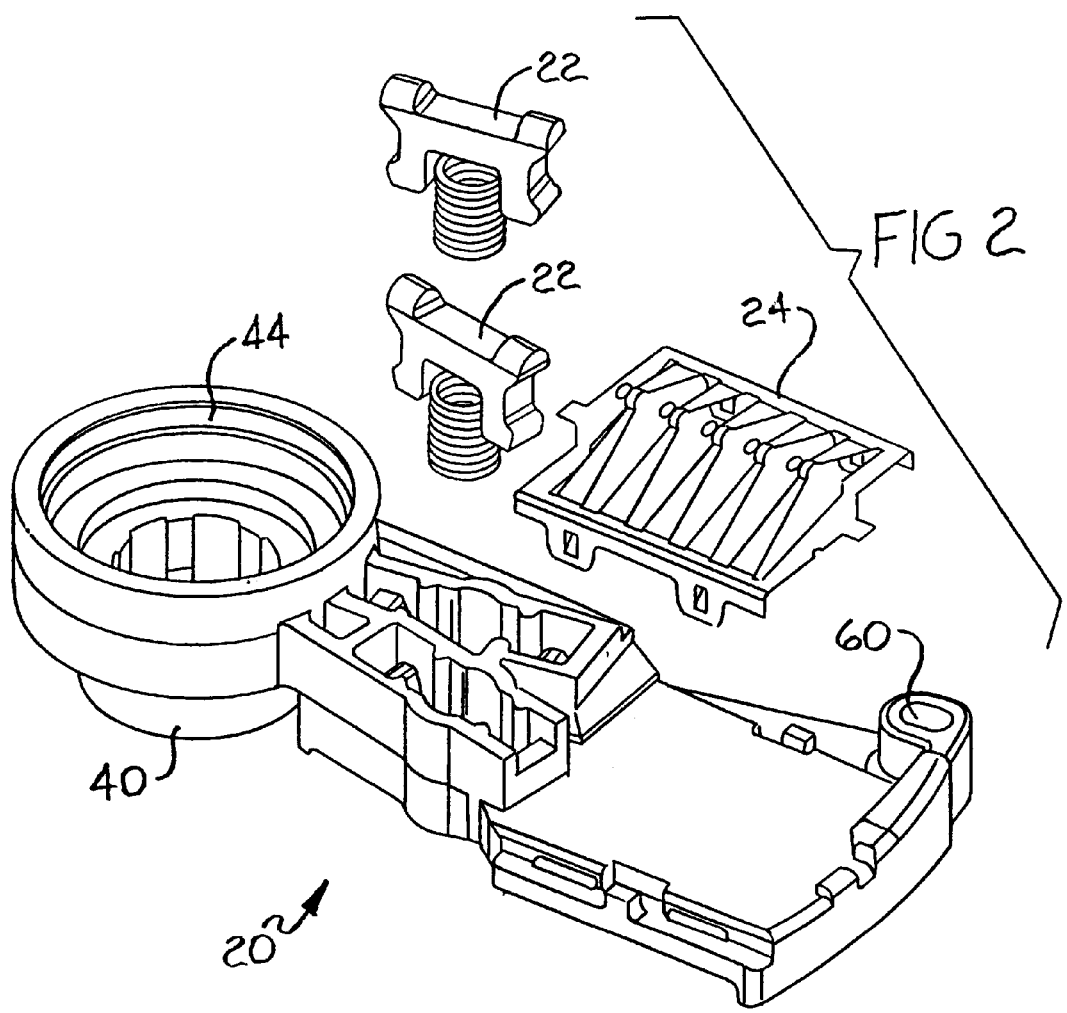

SWITCH SENSOR WITH INTERNAL SHEAR PIN DESIGN

BACKGROUND OF THE INVENTION

1. Field of the Invention

The present invention relates generally to switch sensors, and more particularly, a transmission range switch with an internal shear pin design.

2. Background and Summary of the Invention

Transmission range switches contain switching circuits that are arranged to open and close in response to the driver's shift lever selection. The switching circuits perform independent electrical interlocking functions for starting, back-up lamps and various vehicle accessories. In addition, other circuits are independently arranged to open and close in unique combinations for each transmission gear range and provide a coded output to the vehicle. The transmission range switch references the manual shaft angular position with respect to the transmission case. The neutral/start switch portion of the sensor inhibits vehicle start in all selector ranges except neutral and park, and provides continuity to illuminate the back-up lamps in reverse only. The sensing portion of the sensor provides a signal to the vehicle identifying the transmission manual lever position.

It is necessary to maintain the transmission range switch in a predetermined position (for example neutral) during installation onto the transmission. Current methods of assuring that the range switch is maintained in a predetermined position during installation include the use of an external shear pin, a disposable alignment bracket or an alignment tool.

With the external shear pin, a shear pin is inserted through a hole in the outside of the switch and pressed into a hole in the carrier. The hole in the outside of the switch is sealed either with an O-ring or an adhesive. Retention of the shear pin is accomplished by heatstaking the housing and shear pin or by the adhesive.

With the disposable alignment bracket, a stamped metal part aligns features on the housing and carrier to hold the switch in neutral. Once the switch is installed on the transmission, the bracket is removed and discarded.

With the alignment tool, a tool or fixture at the assembly plant aligns features on the housing and carrier and maintains them in position until the installation is completed.

It is important that these switches are sealed against environmental moisture, dust and dirt for reliability and durability. The external shear pin method for aligning the carrier has potential leak paths through which external contamination could enter the switch. Further, the disposable alignment bracket method creates disposal problems with respect to the disposable bracket. In addition, the tool alignment method requires further assembly steps during installation.

Accordingly, it is an object of the present invention to provide a transmission switch sensor which supports the carrier in a predetermined position for installation and which eliminates potential leak paths for external contamination. The internal shear pin technique is self-contained with no additional assembly steps required during installation and nothing needs to be discarded.

These, and other objects of the present invention are obtained by providing a switch sensor including a housing having a switch circuitry disposed within the housing. An electrical contactor carrier is movably mounted within the housing. The electrical contactor carrier includes an opening therein and the housing includes a corresponding recess portion for receiving a shear pin therein wherein the shear pin is completely internal with respect to the switch sensor housing.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 2 is an exploded perspective view showing the components of the electrical contactor carrier of the switch sensor according to the principles of the present invention; and FIG. 3 is a cross-sectional view illustrating the shear pin connection between the carrier and the housing for holding the carrier in a predetermined position during installation according to the principles of the present invention.

DETAILED DESCRIPTION OF THE PREFERRED EMBODIMENTS

Figure 1:
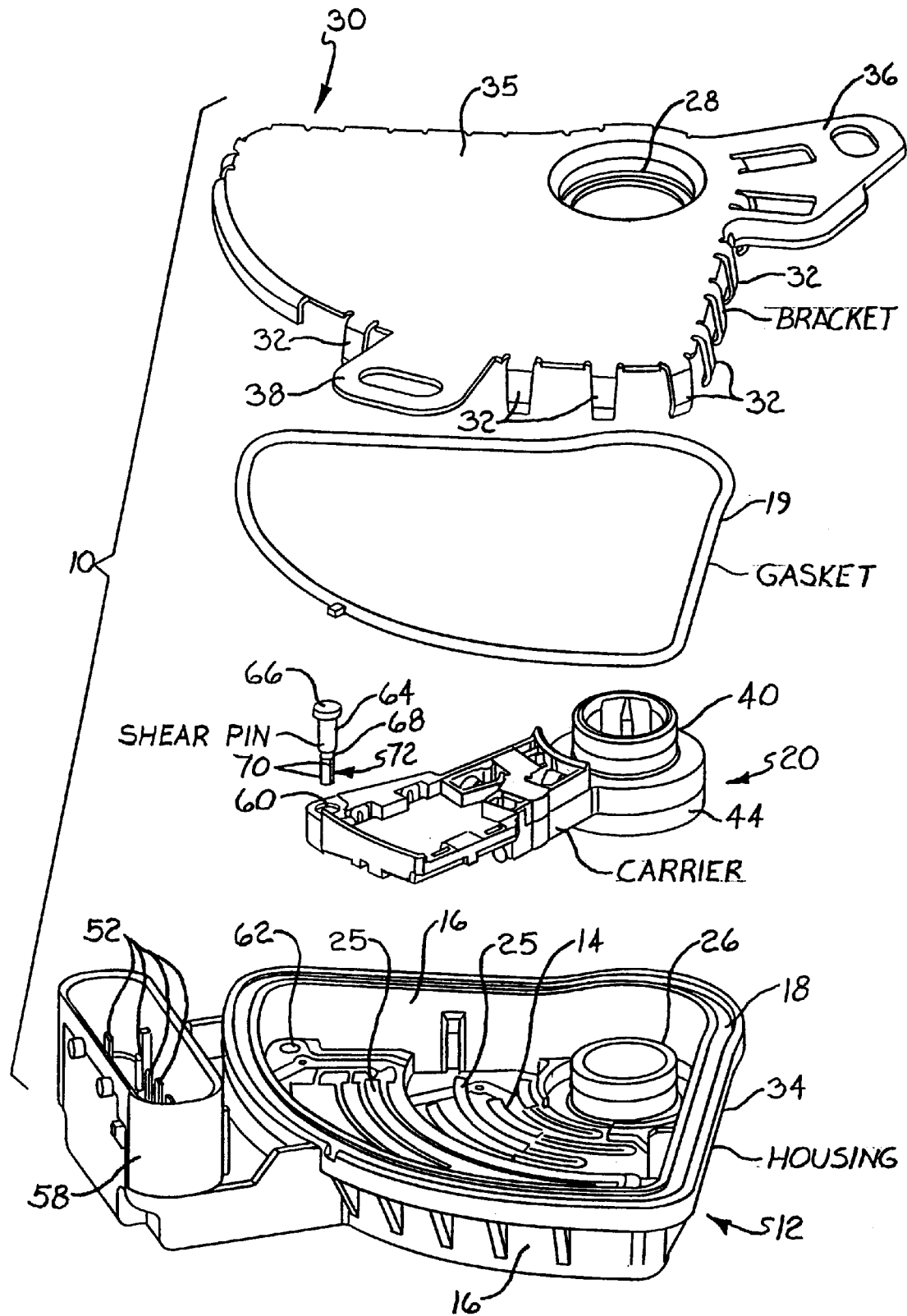
FIG. 1 is an exploded perspective view of each of the components of the transmission range switch sensor according to the principles of the present invention.

With reference to the accompanying figures, the transmission range switch sensor, according to the principles of the present invention, will now be described.

The transmission range switch sensor 10 includes a housing 12 which houses a circuit assembly such as a switch circuitry 14 depending upon customer requirements as best shown in FIG. 1. The housing 12 includes a plurality of sidewalls 16 which are provided with a groove 18 for receiving a gasket 19 or other seal means. An electrical contactor carrier 20 is rotatably mounted within the housing 12 and supports high current contactors 22 and low current contactors 24 for engaging contact pads 25 of the switch circuitry 14. The carrier 20 is rotatably mounted to a first hub 26 of housing 12 and a second hub 28 of a mounting bracket/cover 30 which is mounted to the housing 12.

The mounting bracket/cover 30 includes a plurality of clinch tabs 32 which are bent to engage a flange 34 which extends from the sidewalls 16 of the housing 12. The mounting bracket/cover 30 includes a base portion 35 which generally corresponds to the shape of the housing 12 and also includes bracket mounting portions 36, 38 which are used for mounting the switch sensor 10 to the vehicle structure. The bracket mounting portions 36, 38 are shown for illustrative purposes, however, one having ordinary skill in the art should recognize that various mounting bracket configurations can be utilized.

The hub portion 28 of mounting bracket 30 receives a first annular hub portion 40 of the carrier 20, as best shown in FIG. 1. A seal is provided between the hub 28 of mounting bracket/cover 30 and the annular hub portion 40 of carrier 20. The hub portion 40 of carrier 20 is adapted to be attached to a shaft which corresponds to the position of the transmission shift lever.

A second seal is provided between the hub 26 of housing 12 and a second annular hub portion 44 of carrier 20. The carrier 20 and switch circuitry 14 are of known design and are currently used in transmission switch sensors produced by the assignee of the present invention.

The switch circuitry 14 communicates through terminal clusters 52 to perform independent electrical interlocking functions for starting, back-up lamps, and various vehicle accessories. Furthermore, the terminal clusters 52 provide circuits to open and close in unique combinations for each transmission gear range and provide a coded output to either the powertrain control module or instrument panel for electronic PRNDL display. The terminal clusters 52 are provided within a terminal housing portion 58 of housing 12.

During installation, the carrier 20 of the switch 10 is required to be in a predetermined position with respect to the housing 12 so that proper orientation between the carrier 20 and the shaft is assured. The carrier 20 is provided with a shear pin hole 60 and the housing 12 is provided with a corresponding hole 62. During assembly of the transmission range switch 10, the shear pin hole 60 in the carrier 20 is aligned with the corresponding hole 62 in the housing. A shear pin 64 is then pressed through the hole 60 in the carrier 20 and into the hole 62 in the housing 12. The shear pin 64 includes a plurality of radially extending ribs 70 which provide an interference fit with the hole 62 of housing 12 to prevent the end portion 72 of the shear pin 64 from falling out of the hole 62 in the housing 12 after the shear pin 64 is broken.

The internal shear pin design maintains the transmission switch 10 in a predetermined position such as neutral for installation onto the transmission. Once the switch 10 has been mounted, the shear pin 64 breaks when the transmission is shifted for the first time. This method of maintaining the transmission switch 10 in a predetermined position is unique because it is totally contained on the inside of the switch 10. Potential leak paths created by external shear pin designs where external contamination could enter the switch have been eliminated.

The design of the present invention reduces the parts count by eliminating O-rings or adhesives typically used to enclose the area around external shear pin designs. The internal shear pin design of the present invention could be used on rotary and/or linear switches as would be understood by one of ordinary skill in the art. The head of the shear pin is maintained in the shear pin hole 60 of the carrier 20 and will not fall out due to the cover 30 providing a block against the head 66 of the shear pin 64. The shear pin 64 is provided with a reduced diameter section 68 which facilitates relatively easy breaking of the shear pin 64 at this location when the transmission is shifted for the first time.

The mounting bracket/cover 30 encloses the open end of housing 12 and is securely mounted thereto by a plurality of spaced clinch tabs 32. The clinch tabs 32 are bent to wrap around the flange 34 which extends around the periphery of the sidewalls 16 of the housing 12. The mounting bracket/cover 30 is preferably formed from stamped sheet metal and the clinch tabs 32 are integrally formed therewith. The gasket 19 is provided in the groove 18 and is squeezed by the mounting bracket/cover 30 to tightly fit between the housing 12 and mounting bracket/cover 30. Thus, a sealed fit between the housing 12 and mounting bracket/cover 30 is provided for sealing against environmental moisture, dust and dirt.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A switch sensor, comprising:

a housing including a body portion and a cover;

a switch circuitry assembly disposed within said housing;

an electrical contactor carrier movably mounted within said housing, said electrical contactor carrier including a first opening therein and said housing including a corresponding second opening therein; and a shear pin inserted in said first and second openings for temporarily maintaining said carrier in a predetermined position relative to said housing, wherein said shear pin is completely internal with respect to said housing.

2. The switch sensor according to claim 1, wherein said shear pin includes a head portion which rests against said carrier.

3. The switch sensor according to claim 1, wherein said shear pin is press fit in said second hole in said housing.

4. The switch sensor according to claim 1, wherein said shear pin has a reduced diameter portion to facilitate breaking of the shear pin under shear forces.

5. The switch sensor according to claim 1, wherein said cover of said housing maintains a head portion of said shear pin in said first hole in said electrical contactor carrier.

6. The switch sensor according to claim 1, wherein said shear pin has a plurality of radially extending ribs which engage said second opening in said housing.

* * * * *